United States Patent
Sigg et al.

(10) Patent No.: US 8,867,348 B1
(45) Date of Patent: Oct. 21, 2014

(54) MANAGEMENT OF BACKHAUL CAPACITY IN A WIRELESS COMMUNICATION SYSTEM

(75) Inventors: Jason P. Sigg, Overland Park, KS (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 148 days.

(21) Appl. No.: 13/547,668

(22) Filed: Jul. 12, 2012

(51) Int. Cl.
*H04L 25/22* (2006.01)
*H04N 7/20* (2006.01)

(52) U.S. Cl.
CPC . *H04L 25/22* (2013.01); *H04N 7/20* (2013.01)
USPC .......................................................... 370/230

(58) Field of Classification Search
CPC ........ H04L 25/22; H04L 9/0855; H04B 3/20; H04B 7/15; H03H 7/46; H04N 7/20
USPC .......................................................... 370/230
See application file for complete search history.

(56) References Cited

U.S. PATENT DOCUMENTS

| | | | |
|---|---|---|---|
| 6,603,971 B1 | 8/2003 | Mohebbi | |
| 6,606,497 B2 | 8/2003 | Mohebbi | |
| 6,832,093 B1 * | 12/2004 | Ranta | 455/456.4 |
| 2004/0097254 A1 * | 5/2004 | Laroia et al. | 455/522 |
| 2006/0223449 A1 | 10/2006 | Sampath et al. | |
| 2009/0046665 A1 | 2/2009 | Robson et al. | |
| 2009/0197570 A1 * | 8/2009 | Horn et al. | 455/410 |
| 2009/0207772 A1 * | 8/2009 | Ehara et al. | 370/312 |
| 2010/0144361 A1 * | 6/2010 | Gholmieh et al. | 455/450 |
| 2011/0044169 A1 * | 2/2011 | Liu | 370/235 |
| 2011/0105166 A1 * | 5/2011 | He et al. | 455/507 |
| 2011/0164694 A1 * | 7/2011 | Yamasaki et al. | 375/259 |
| 2013/0064107 A1 * | 3/2013 | Sridhar | 370/252 |

* cited by examiner

*Primary Examiner* — Mark Rinehart
*Assistant Examiner* — Ellen A Kirillova

(57) ABSTRACT

A method and system for managing backhaul capacity between radio access network (RAN) infrastructure and a plurality of base stations providing coverage areas in the active set of a wireless communication device (WCD), where each base station has a respective backhaul link with the RAN infrastructure. An example implementation of the method involves determining separately for each base station a ratio of a quantity of control data to bearer data on the base station's backhaul link, determining that a given one of the base stations has the lowest determined ratio of the determined ratios, and responsively transitioning to a restricted mode where control data communication with the WCD occurs via just that base station and not via the other base stations, but bearer data communication with the WCD occurs via all of the base stations.

19 Claims, 5 Drawing Sheets

MANAGEMENT OF BACKHAUL CAPACITY IN A WIRELESS COMMUNICATION SYSTEM

BACKGROUND

In a typical cellular wireless communication system, a radio access network (RAN) includes a plurality of base stations, each of which radiates to define one or more air interface coverage areas such as a cell and cell sectors in which wireless communication devices (WCDs) can be served by the RAN. Generally or on a region by region basis, the base stations of the system may then all be connected with common RAN infrastructure, such as a base station controller (BSC), radio network controller (RNC), mobile switching center (MSC), packet data serving node (PDSN), or the like, which may function to control certain aspects of base station operation and certain aspects of the air interface and may provide connectivity with one or more transport networks such as the public switched telephone network (PSTN) and the Internet for instance. With this arrangement, a WCD served by the RAN may wirelessly communicate with other served WCDs or with entities on the one or more transport networks, with communications passing through the air interface, one or more base stations, and the RAN infrastructure.

The base stations in such a system may communicate with served WCDs according to an agreed air interface protocol, examples of which include CDMA (code division multiple access), LTE (long term evolution), WiMAX (wireless interoperability for microwave access), GSM (global system for mobile communications), and others now known or later developed. As a general matter, communications in the direction from the RAN to WCDs define a "forward link" (or downlink), while those in the direction from WCDs to the RAN define a "reverse link" (or uplink).

In practice, air interface communications in each coverage area of such a system may occur on one or more carrier frequencies. Further, the air interface may be divided into channels through a mechanism such as time division multiplexing, code division multiplexing, and/or frequency division multiplexing, for instance. For instance, the forward link may define a pilot channel on which the base station broadcasts a pilot signal for use by WCDs to detect and evaluate coverage, and one or more other control and traffic channels on which the base station may transmit control data and bearer data WCDs. Further, the reverse link may likewise define one or more control and traffic channels on which the WCDs may transmit control data and bearer data to the base station.

Control data that passes over the air interface between a base station and a WCD may function in some manner to control or facilitate operation of the wireless communication system. By way of example, the control data may include power-control signaling for managing the power of air interface transmissions. Further, the control data may include various overhead messages regarding operational parameters of the coverage area or adjacent coverage areas, such as system parameter messages, channel list messages, and neighbor list messages for instance. Depending on the network configuration, the RAN infrastructure may be involved with some or all of this control communication. Therefore, some or all of this control data, or derivations of this control data, may ultimately pass over the backhaul link between the base station and the RAN infrastructure, possibly along with other control data.

The bearer data that passes over the air interface between a base station and a WCD, on the other hand, is typically the application-layer communication content, such as voice data, text-message data, browsing data, or real-time media-session data for instance. As the RAN infrastructure may provide connectivity with one or more transport networks over which such bearer data or derivations of such bearer data may travel, certain bearer data may similarly pass over the backhaul link between the base station and the RAN infrastructure.

In general, when a WCD is actively engaged in a call (e.g., voice call or data session) in a coverage area of the RAN, the WCD may regularly monitor the strength of the pilot signal broadcast by the RAN in that coverage area and the strength of pilot signals broadcast by the RAN in other coverage areas extending to the WCD's position. If the WCD detects a pilot signal from another coverage area that is sufficiently stronger than the pilot signal of the WCD's current coverage area, the WCD may transmit a signal to the RAN to request a handoff of the call to the detected coverage area. The RAN may then assign traffic channel resources to the WCD for use in the new coverage area and direct the WCD to continue the call in the new coverage area.

Under some air interface protocols, a WCD may also be capable of engaging in a call actively in multiple coverage areas at once. In such an arrangement, the WCD may have an "active set" of coverage areas in which the WCD simultaneously exchanges data, including both bearer data and control data, with the RAN. Advantageously, this active-set arrangement can help improve the quality of bearer data communications, as the WCD may exchange the same bearer data concurrently with each of its serving base stations, and both the WCD and the RAN infrastructure may then combine received copies of the bearer data together or select the best copy of received bearer data on a frame-by-frame basis for instance. Likewise, the active set arrangement may help improve control communication as well, by helping to ensure that control data reaches its destination.

In terms of power-control signaling, in the active-set arrangement, separate power control signaling could be carried out for each active set coverage areas, but aggregate changes may be made across the active set coverage areas. For instance, to control power on the forward link, the WCD may evaluate quality or strength of received signals in each active set coverage area and, (i) if the quality or strength in any of the active set coverage areas is threshold good enough, the WCD may send a power-down command on the reverse link in each of its active set coverage areas, but (ii) if the quality or strength in all of the active set coverage areas is threshold poor, the WCD may send a power-up command in each of its active set coverage areas. Further, similar processing could occur at the RAN to control power on the reverse link.

OVERVIEW

In typical practice, a base station may provide multiple coverage areas (such as several cell sectors), each of which may serve multiple active WCDs at once, and the backhaul link between the base station and the RAN infrastructure may carry control data and bearer data associated with all of those coverage areas and thus all of those WCDs. By design, the backhaul link may be arranged with sufficient capacity to carry all of this data without a problem. However, at times, the backhaul link may become so heavily loaded that the link may be unable to carry additional data in a timely manner. When this happens, WCDs seeking to be served by the base station experience blocked or dropped calls, which may lead to poor user experience.

Disclosed herein is a method and corresponding system to help manage backhaul capacity in an effort to reduce or avoid such problems. The method stems from a recognition that (i)

in practice, different backhaul links may carry different relative extents of control data versus bearer data, and (ii) it may not be strictly necessary in a given scenario for a WCD to be sending/receiving control data in all of its active set coverage areas at once. Considering these points, the method may advantageously involve evaluating the ratio of control data to bearer data on each of the backhaul links for a WCD's active set, and, based on that evaluation, limiting control data communication with the WCD to occur via just one (or some other number less than all) of the WCD's active set base stations while allowing bearer data communication with the WCD to occur via all of the WCD's active set base stations.

Furthermore, the method could be extended to variations on this process as well. For example, in a given system, there may be better reason to have control data be communicated with the WCD via all of the WCD's active set base stations, while allowing bearer data to be communicated with the WCD via just one (or some other number less than all) of the WCD's active set base stations. In that case, the method could involve evaluating the ratio of control data to bearer data on each of the backhaul links for the WCD's active set and, based on that evaluation, limiting certain bearer data communication with the WCD to occur via just one (or some other number less than all) of the WCD's active set base stations while allowing control data communication with the WCD to occur via all of the WCD's active set base stations.

Generalizing this, in a given system, communications over the air interface may include a first type of data and a second type of data (possibly among other types of data). The method may then involve evaluating the ratio of the first type of data to second type of data on each of the backhaul links for the WCD's active set and, based on that evaluation, limiting communication of the first type of data with the WCD to occur via just one of the WCD's active set base stations while allowing communication of the second type of data with the WCD to occur via all of the WCD's active set base stations.

Accordingly, in one respect, disclosed herein is a method for a wireless communication system to manage backhaul capacity between RAN infrastructure and a plurality of base stations, where the base stations concurrently serve a WCD each over a respective air interface and each have a respective backhaul link with the RAN infrastructure. The method may involve determining separately for each base station a ratio of (i) a quantity of a first type of data carried by the base station's respective backhaul link to (ii) a quantity of a second type of data carried by the base station's respective backhaul link. The method may then involve determining that a given one of the base stations has the lowest determined ratio of the determined ratios. And in response to determining that the given base station has the lowest determined ratio of the determined ratios, the method may involve the system transitioning to a restricted mode in which the given base station communicates with the WCD the first type of data and the second type of data but each other base station of the plurality communicates with the WCD the second type of data and not the first type of data.

Further, in another respect, disclosed herein is a method of managing backhaul capacity in a wireless communication system in which a plurality of base stations concurrently serve a WCD, where each base station communicates both control data and bearer data with the WCD, and each base station has a respective backhaul link with RAN infrastructure, and the plurality of base stations includes a given base station and one or more other base stations. Such a method may involve determining that, among the respective backhaul links of the plurality of base stations, the respective backhaul link of the given base station has a lowest ratio of control data to bearer data. In turn, responsive to making that determination, the method may then involve the wireless communication system discontinuing communication of control data between the WCD and each other base station, while continuing communication of bearer data between the WCD and each base station of the plurality.

Still further, disclosed herein is an improvement to a wireless communication that includes a RAN infrastructure and a plurality of base stations, where the RAN infrastructure is coupled to each base station by a respective backhaul link, where the plurality of base stations concurrently serve a WCD each via a respective wireless coverage area, and where the respective wireless coverage areas of the plurality of base stations cooperatively define an active set for the WCD. In such a system, the improvement may take the form of backhaul-evaluation logic and communication-control logic, both of which may be integrated with the RAN infrastructure for instance and may operate to carry out functions such as those described above.

In practice, for instance, the backhaul-evaluation logic may function to determine that, among the backhaul links of the base stations, the backhaul link of a given one of the base stations has a lowest ratio of (a) carrying a first type of data to (b) carrying a second type of data. And the communication-control logic may function to respond to that determination by transitioning the system from a first operational mode to a second operational mode. In particular, the first operational mode may involve all of the base stations of the plurality communicating both the first and second types of data with the WCD, whereas the second operational mode may involve (i) the given base station communicating both the first and second types of data with the WCD while (ii) each other base station of the plurality communicates the second type of data with the WCD but does not communicate the first type of data with the WCD.

These as well as other aspects, advantages, or alternatives will become apparent to those of ordinary skill in the art by reading the following detailed description, with reference where appropriate to the accompanying drawings. Further, it should be understood that the description provided by this overview section and elsewhere in this document is intended to explain and illustrate the invention by way of example only.

DETAILED DESCRIPTION

Figure 1:
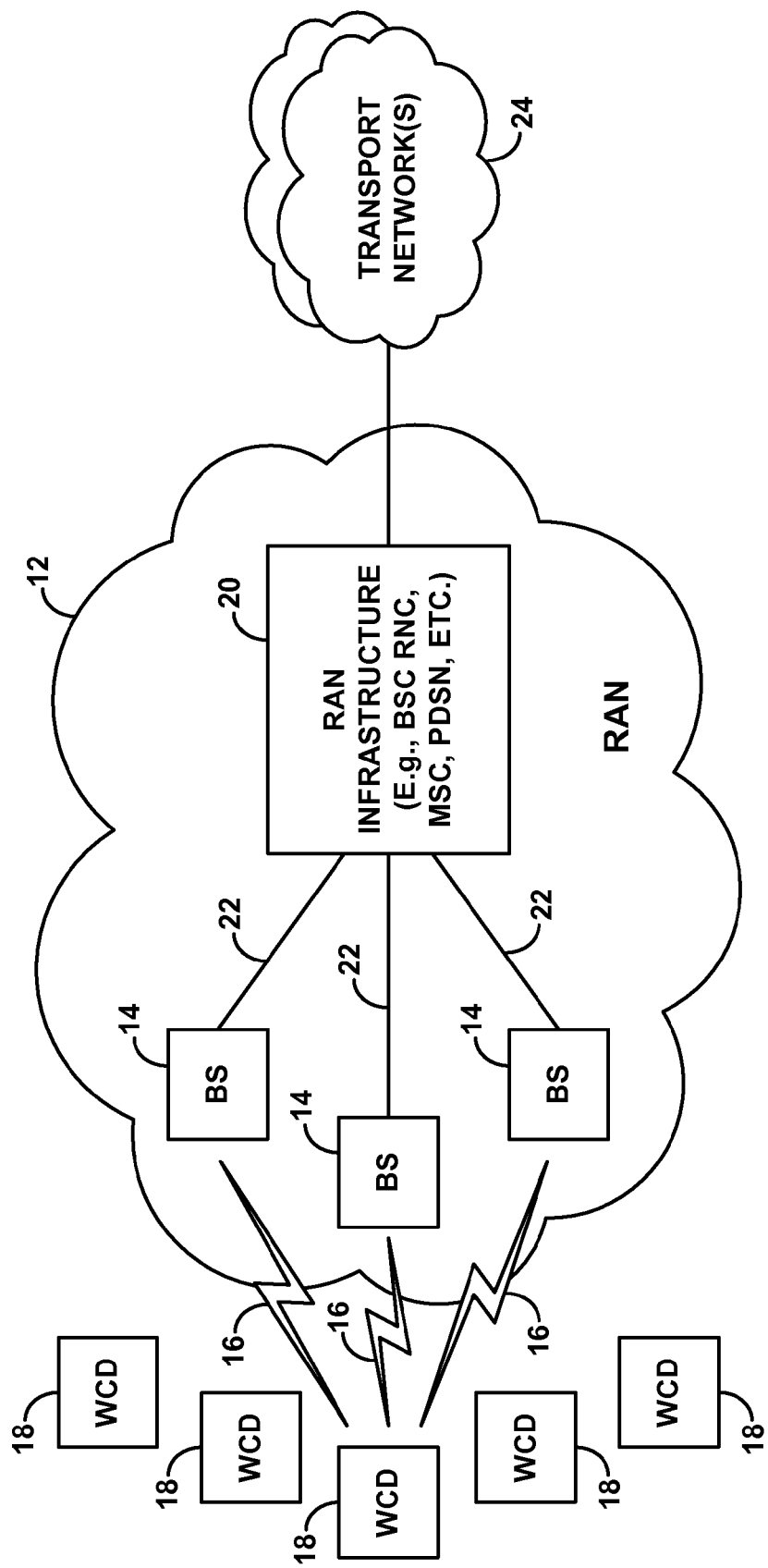
FIG. 1 is a simplified block diagram of an example wireless communication system in which the present method can be implemented.

For simplicity, the present method and corresponding system will be described herein primarily with respect to evaluation of control data and bearer data on the backhaul links for a WCD's active set, and consequent restriction of control-data communication to occur via just one (or some other proper subset) of the WCD's active set coverage areas. The control data and bearer data at issue may be of the type discussed above or may take other forms. Further, the control data and/or bearer data that is the subject of the evaluation and/or the restriction may be particular data, such as particular control messages and/or particular bearer data, thus excluding from the analysis other such data, or may instead be all such data.

Referring to the drawings, as noted above, FIG. 1 is a simplified block diagram of a wireless communication system in which the present method can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 1 depicts the example communication system as including at its core a RAN 12 having a number of base stations 14 that each radiate to define one or more air interface coverage areas 16 through which the base station may communicate with one or more served WCDs 18. The RAN then further includes RAN infrastructure 20, which is arranged to communicate with each of the base stations 14 via a respective backhaul link 22, and which provides connectivity with one or more transport networks 24 such as the PSTN or the Internet for instance. With such an arrangement, a WCD 18 that is positioned within coverage of a base station and that is suitably equipped may engage in air interface communication with the base station and may thereby communicate with remote entities on the transport network(s) and/or with other WCDs served by the RAN.

FIG. 1 shows a representative WCD 18 being served concurrently by the three illustrated base stations 14. In practice, for instance, the WCD 18 may have an active set consisting of the three illustrated coverage areas 16, one provided respectively by each of the base stations 14. As noted above, with this arrangement, the WCD may concurrently exchange data, including both control data and bearer data, with all three of the base stations 14, and much of that data may flow over the illustrated backhaul links 22 between the base stations and the RAN infrastructure.

For instance, to transmit bearer data to the RAN, the WCD may transmit a copy of the bearer data to each of its serving base stations, and the base stations may then forward the bearer data via their backhaul links to the RAN infrastructure. And when the RAN has bearer data to transmit to the WCD, the RAN infrastructure may send the data via the backhaul links to each of the serving base stations, and the base stations may then wirelessly transmit the data to the WCD. Further, the WCD may send power control commands and/or other control data to each of its serving base stations, and the base stations may forward that control data via their backhaul links to the RAN infrastructure. And the RAN infrastructure may likewise transmit power control commands and/or other control data via the backhaul links to the base stations, and the base stations may wirelessly transmit that control data to the WCD.

As a general matter, the RAN infrastructure may comprise one or more RAN components, examples of which include a BSC, RNC, MSC, or PDSN, or others, depending on the system implementation. As such, the backhaul link extending from a base station 14 to the RAN infrastructure 20 may take any of a variety of forms (and the illustrated backhaul links may differ in form from each other), possibly including a number of intermediate nodes and/or hops. In practice, the entire backhaul link extending end to end from the base station to the RAN infrastructure may be considered the relevant backhaul link for purposes of the present method (namely, evaluation of relative extent of control data versus bearer data). However, in an alternative arrangement, one or more portions of the end-to-end backhaul link may be considered the relative backhaul link. For instance, in an arrangement where the base station is connected by a first link with an intermediate node and that node is then connected by a second link with a BSC functioning as the RAN infrastructure, either the first link or the second link could be considered the relevant backhaul link. Other examples are possible as well.

Regardless of its form, each backhaul link 22 will generally have a limited capacity to carry data flowing between the base station and the RAN infrastructure. By way of example, a representative backhaul link may comprise a T1 line that is time division multiplexed into a number of individual channels and can carry up to about 1.544 megabits per second. In practice, if a portion of that capacity is used to carry control data, only a limited portion of the capacity may then be available to carry bearer data, and vice versa.

As noted above, the present method may help to manage such limited capacity by tracking the backhaul link of each base station that provides a coverage area in a WCD's active set and limiting control data communication with the WCD to occur via just the coverage area whose base station has the lowest ratio of control data to bearer data, while allowing bearer data communication with the WCD to occur via all of the coverage areas of the WCD's active set. Advantageously, this method can thereby help to reduce the control data load on the backhaul links that would benefit most, namely, the backhaul links that have the highest relative load of control data compared with bearer data.

In practice, this method may be carried out by the RAN infrastructure 20 and/or one or more other RAN entities (possibly including one or more of the base stations 14). In particular, on an ongoing basis, the RAN infrastructure may monitor data communication on each of the backhaul links, keeping separate tallies of the extent of control data communicated on the link and the extent of bearer data communicated on the link.

For instance, each time the RAN infrastructure sends on a backhaul link a channel list message, neighbor list message, power control command, or other control data of a certain number of bits, the RAN infrastructure may increase the control data tally for that backhaul link by that number of bits. Likewise, each time the RAN infrastructure receives on a backhaul link a power control command or other control data of a certain number of bits, the RAN infrastructure may increase the control data tally for that backhaul link by that number of bits. Further, each time the RAN infrastructure sends or receives on a backhaul link any bearer data of a certain number of bits, the RAN infrastructure may increase the bearer data tally for that backhaul link by that number of bits. Moreover, the RAN infrastructure may keep these tallies on a sliding window basis or as some other statistical measure. For instance, the RAN infrastructure may record the time and quantity of each increase in a tally and after a predefined window of time may then automatically decrease the tally by the same amount.

Provided with these tallies, the RAN infrastructure may then regularly or dynamically establish (compute) for each backhaul link a ratio of control data communicated on the link to bearer data communicated on the link. For instance, for one backhaul link, the RAN infrastructure may determine that the ratio of control data to bearer data is 20%, for another backhaul link, the RAN infrastructure may determine that the ratio of control data to bearer data is 10%, and for another backhaul link, the RAN infrastructure may determine that the ratio of control data to bearer data is 12%. As the number of WCDs served in various coverage areas changes from time to time, and possibly for other reasons, these ratios may change over time for individual backhaul links.

For each active WCD served by the RAN, the RAN infrastructure may then also maintain a record of the WCD's active set of coverage areas and an indication for each coverage area of the base station and associated backhaul link. In a default mode of operation, such as when the WCD first begins operation with the current active set, both control data and bearer data may pass between the WCD and each of the WCD's serving base stations. However, upon evaluation of the backhaul links for each of the WCD's active set coverage areas, the RAN infrastructure may determine from the control data and bearer data tallies that a given one of the backhaul links has the lowest ratio of control data to bearer data, and the RAN infrastructure may then responsively transition the system to the restricted mode noted above, so as to limit control data communication to pass via just that given backhaul link.

Considering that much or all of the control data at issue in this process flows ultimately between the RAN infrastructure and the WCD, one way to transition to the restricted mode of operation is for the RAN infrastructure to (i) itself stop sending control data to the WCD via the other backhaul links but to continue sending control data to the WCD via the given backhaul link and (ii) send a directive to the WCD to cause the WCD to stop sending control data in the coverage areas corresponding with the other backhaul links but to continue sending control data in the coverage area corresponding with the given backhaul link. Other implementations may be possible as well.

Figure 2:
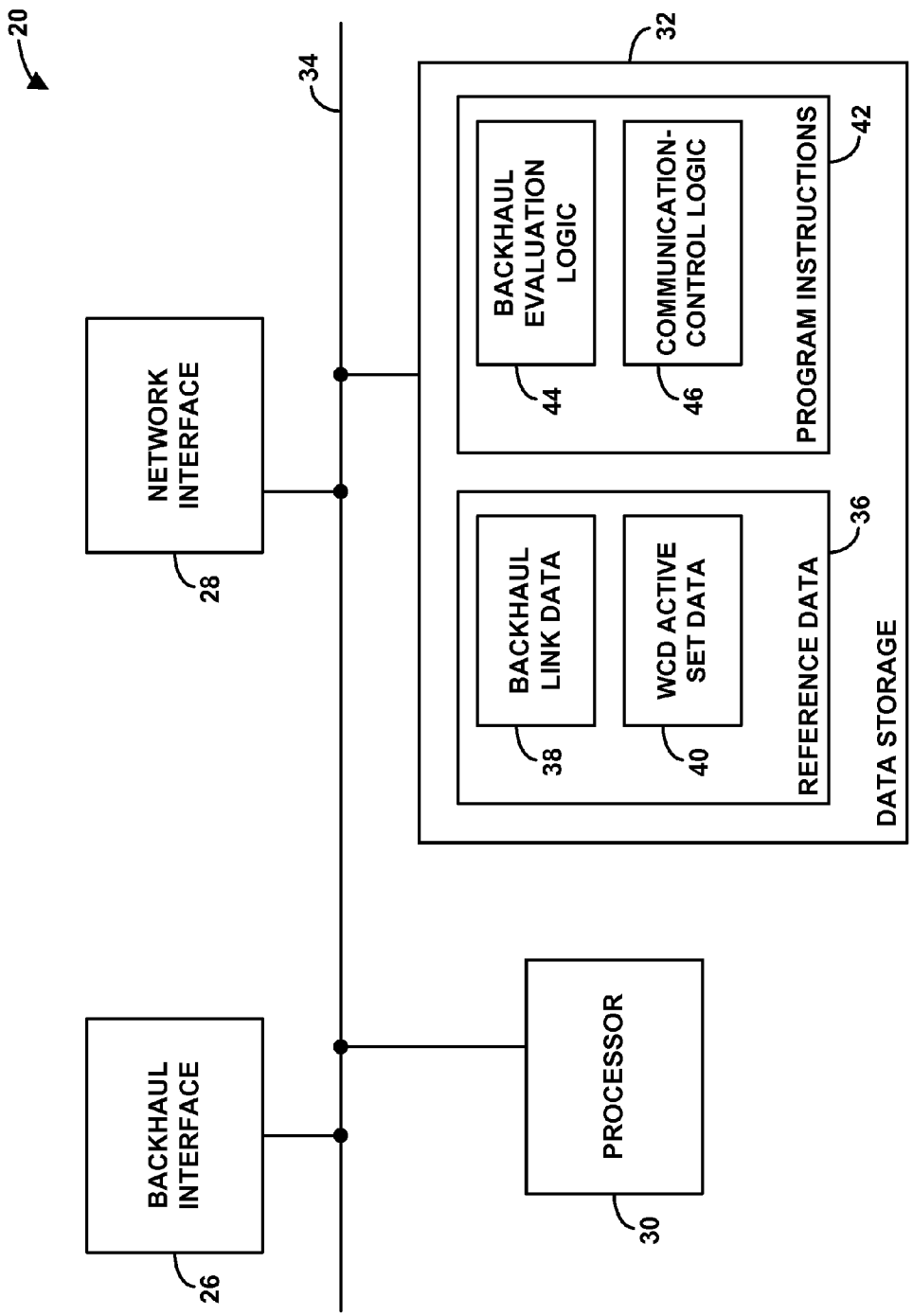
FIG. 2 is a simplified block diagram of example RAN infrastructure operable in the method.

FIG. 2 is next a simplified block diagram of example RAN infrastructure 20, showing some of the components that can be included in such infrastructure to facilitate implementation of some or all of these functions. This RAN infrastructure may be provided as a single node in the RAN 12 or distributed among various nodes in the RAN, and may also include one or more nodes outside of the RAN.

As shown in FIG. 2, the example RAN infrastructure includes a backhaul interface 26, a network interface 28, a processor 30, and data storage 32, all of which may be communicatively linked together by a system bus, network, or other connection mechanism 34.

In practice, the backhaul interface 26 may comprise any interface suitable for communicating over the various backhaul links 22 with base stations 14. For instance, if each backhaul link takes the form of a T1 line, then the backhaul interface 26 may comprise a conventional T1 network interface card. Alternatively, if a backhaul link takes other forms, the backhaul interface may similarly take other forms.

Network interface 28, on the other hand, may then provide for connectivity with downstream elements such as transport networks 24. As such, network interface 28 may comprise any suitable connecting interface, such as a T1 network interface card as well. Further, in some implementations, network interface 28 and backhaul interface 26 may be integrated together in whole or in part.

Processor 30 may comprise one or more general purpose processors (e.g., microprocessors) and/or special-purpose processors (e.g., digital signal processors and/or application specific integrated circuits). And data storage 32 may comprise one or more volatile and/or non-volatile storage components (such as magnetic, optical, flash or other non-transitory storage) and may be integrated in whole or in part with processor 30.

As shown, data storage 32 may hold reference data 36, which may comprise backhaul-link data 38 and WCD active set data 40. The backhaul-link data 38 may comprise, on a per backhaul link basis, the control data and bearer data tallies noted above, as well as data indicating the coverage areas and base stations that correspond with the backhaul link. The WCD active set data 40 may then comprise, on a per WCD basis, data indicating the coverage areas in the WCD's active set, and data indicating which of the active set coverage areas will carry control data in the restricted mode.

Further, data storage 32 may also hold program instructions 42 that are executable by processor 30 to carry out various RAN infrastructure functions described herein, or to cause the RAN infrastructure to carry out such functions. For instance, in accordance with the program instructions, the processor may maintain the control data and bearer data tallies per backhaul link, the processor may determine for each backhaul link associated with a WCD's active set a ratio of control data to bearer data, the processor may determine which of those backhaul links has the lowest determined ratio of control data to bearer data, and the processor may then transition the system to a restricted mode as noted above, to have control data flow to/from the WCD via just the coverage area whose backhaul link was determined to have the lowest ratio of control data to bearer data.

In practice, the program instructions 42 or other logic in the RAN infrastructure may thus be considered to define backhaul-evaluation logic 44 and control-communication logic 46, which may be separate or integrated program logic modules. The backhaul-evaluation logic may function to determine that, among the backhaul links of the base stations, the backhaul link of a given one of the base stations has a lowest ratio of control data to carrying bearer data. The communication-control logic may then function to respond to that determination by transitioning the system from a first operational mode to a second operational mode. In particular, in the first operational mode, all of the base stations of the WCD's active set would communicate both control data and bearer data with the WCD, and in the second operational mode, (i) the given base station would communicate both control data and bearer data with the WCD while (ii) each other base station of the WCD's active set would communicate bearer data with the WCD but would not communicate control data with the WCD.

Figure 3:
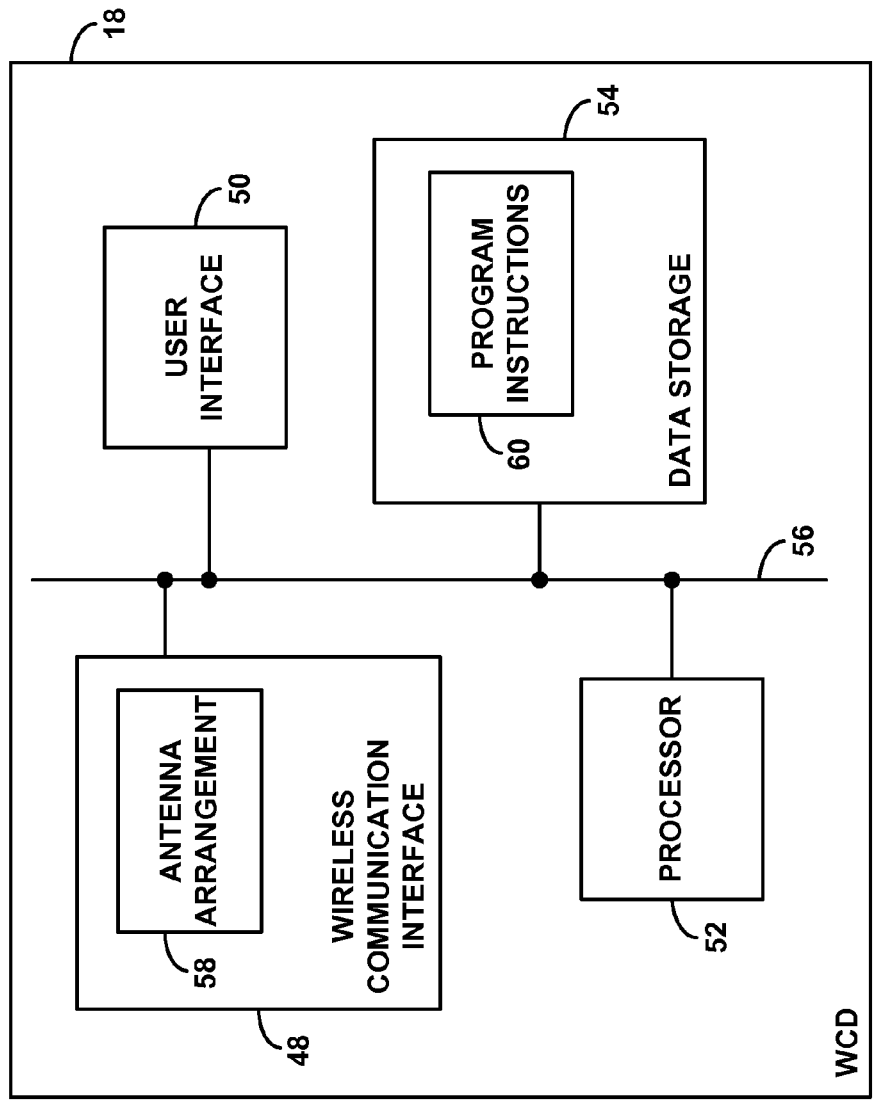
FIG. 3 is a simplified block diagram of an example WCD operable in the method.

FIG. 3 is next a simplified block diagram of a representative WCD 18 (also possibly referred to as user equipment, a mobile station, a wireless communication device, or the like), such as a cellular telephone, wirelessly equipped tablet or personal computer, or embedded wireless communication module, for instance, illustrating some of the components that can be included in such a device. As shown, the representative WCD may include a wireless communication interface 48, a user interface 50, a processor 52, and data storage 54, all of which may be coupled together by a system bus, network, or other connection mechanism 56.

Wireless communication interface 48 may comprise an antenna arrangement 58 and associated components such as a mobile station modem for instance, for engaging in communication with serving base stations 14, such as to transmit control data and bearer data to the base stations and to receive control data and bearer data from the base stations.

User interface 50 may then facilitate interaction with a user of the WCD if applicable. As such, the user interface may include output components such as a display screen, loudspeaker, and headphone jack, and input components such as a keypad, a touch-sensitive screen, and a camera.

Processor 52 may then comprise one or more general purpose processors and/or special-purpose processors and may be integrated in whole or in part with wireless communication interface 48. And data storage 54 may comprise one or more volatile and/or non-volatile storage components (such as magnetic, optical, flash or other non-transitory storage) and may be integrated in whole or in part with processor 52.

As shown, data storage 54 may hold program instructions 60, which may be executable by processor 52 to carry out various WCD functions described herein, or to cause the WCD to carry out such functions. For instance, in accordance with the program instructions 60, the processor 52 may receive a forward link control signal that directs the WCD to engage in control data communication via just a particular one of the WCD's active set coverage areas but to continue engaging in bearer data communication via all of the WCD's active set coverage areas, and the processor may responsively cause the WCD to act as directed.

Figure 4:
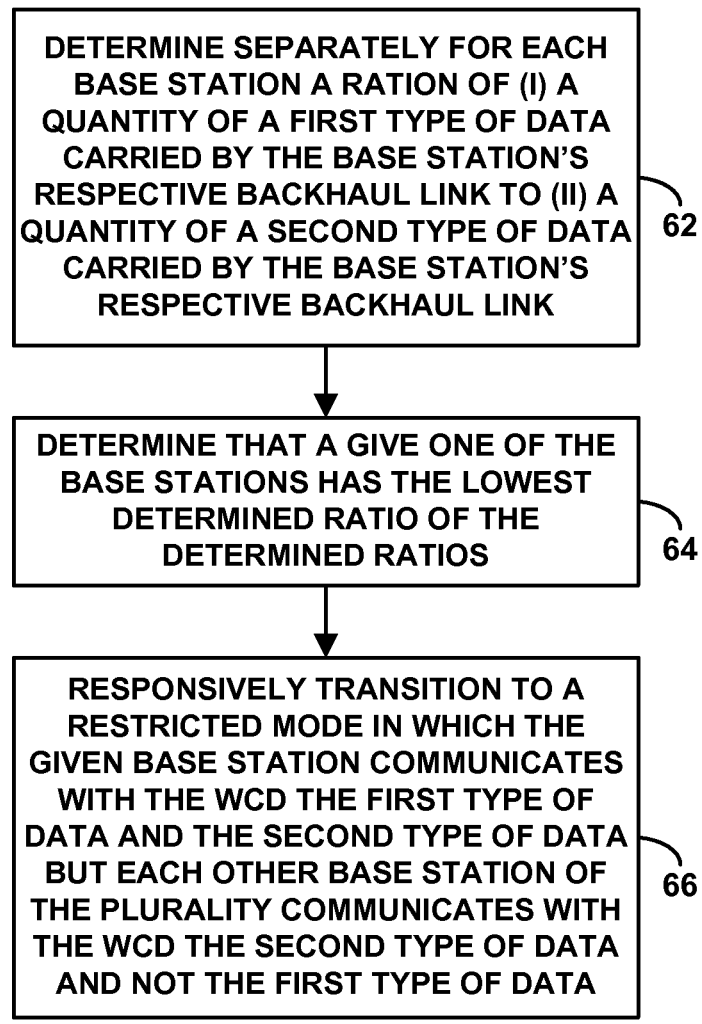
FIG. 4 is a flow chart depicting functions that can be carried out in accordance with the method.

FIG. 4 is next a flow chart depicting functions that can be carried out in accordance with an example implementation of the present method. This flow chart generalizes the process described above, to extend to first and second types of data, where the first type of data may be control data (such as particular control messages of the type discussed above, or all control data), and the second type of data may be bearer data (such as particular bearer data of the type discussed above, or all bearer data). The method depicted may function to manage backhaul capacity between RAN infrastructure and a plurality of base stations, where the base stations concurrently serve a WCD each over a respective air interface, and where each base station has a respective backhaul link with the RAN infrastructure.

As shown in FIG. 4, at block 62, the example method involves determining separately for each base station a ratio of (i) a quantity of a first type of data carried by the base station's respective backhaul link to (ii) a quantity of a second type of data carried by the base station's respective backhaul link. At block 64, the method then involves determining that a given one of the base stations has the lowest determined ratio of the determined ratios. And at block 66, in response to making the determination at block 64, the method involves transitioning to a restricted mode in which the given base station communicates with the WCD the first type of data and the second type of data but each other base station of the plurality communicates with the WCD the second type of data and not the first type of data.

As noted above, one way to transition to the restricted mode is for (i) the RAN infrastructure to discontinue sending of the second type of data to each base station of the plurality other than the given base station, so that each such base station would then not forward the second typed of data to the WCD, and (ii) the RAN infrastructure to transmit to the WCD a control signal that directs the WCD to discontinue sending of the second type of data to each base station of the plurality other than the given base station. The RAN infrastructure may send such a control signal to the WCD in much the same way that the RAN infrastructure sends other control data to the WCD, possibly in a newly defined message or message-field for instance.

Figure 5:
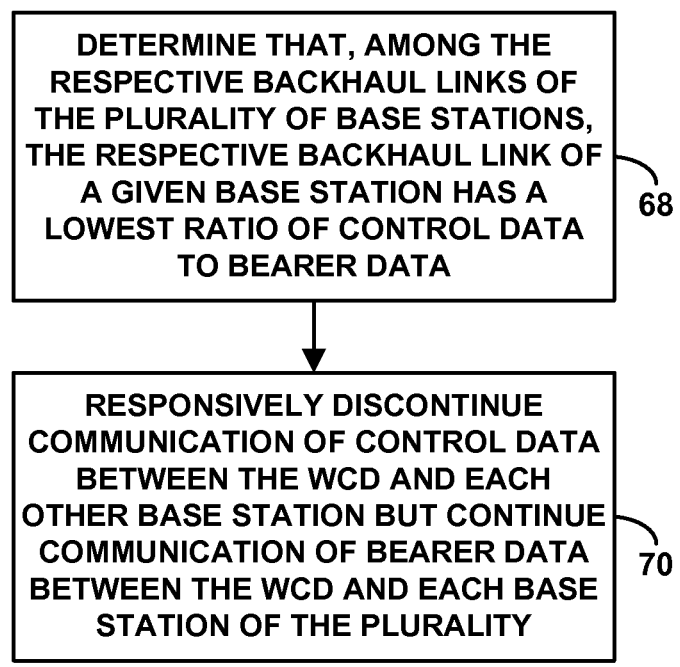
FIG. 5 is a flow chart depicting functions that can be carried out in accordance with the method.

FIG. 5 is then another flow chart depicting functions that can be carried out in accordance with an example implementation of the present method. In line with the discussion above, the method depicted may function to manage backhaul capacity in a wireless communication system in which a plurality of base stations concurrently serve a WCD, where each base station communicates both control data and bearer data with the WCD, where each base station has a respective backhaul link with RAN infrastructure, and where the plurality of base stations includes a given base station and one or more other base stations.

As shown in FIG. 5, at block 68, the example method involves determining that, among the respective backhaul links of the plurality of base stations, the respective backhaul link of the given base station has a lowest ratio of control data to bearer data. Further, at block 70, in response to making that determination, the method involves the wireless communication system discontinuing communication of control data between the WCD and each other base station, while continuing communication of bearer data between the WCD and each base station of the plurality.

Exemplary embodiments have been described above. It should be understood, however, that variations from these embodiments are possible, while remaining within the true spirit and scope of the invention.

We claim:

1. A method for a wireless communication system to manage backhaul capacity between radio access network (RAN) infrastructure and a plurality of base stations, wherein the base stations concurrently serve a wireless communication device (WCD) each over a respective air interface and each have a respective backhaul link with the RAN infrastructure, the method comprising:

determining separately for each base station a ratio of (i) a quantity of a first type of data carried by the base station's respective backhaul link to (ii) a quantity of a second type of data carried by the base station's respective backhaul link;

determining that a given one of the base stations has the lowest determined ratio of the determined ratios; and responsive to determining that the given base station has the lowest determined ratio of the determined ratios, the system transitioning to a restricted mode in which the given base station communicates with the WCD the first type of data and the second type of data but each other base station of the plurality communicates with the WCD the second type of data and not the first type of data.

2. The method of claim 1, wherein the first type of data is control data, and the second type of data is bearer data.

3. The method of claim 2, wherein the first type of data comprises overhead data selected from the group consisting of channel list data, neighbor list, and power control signaling.

4. The method of claim 1, wherein each backhaul link is time division multiplexed.

5. The method of claim 1, wherein the RAN infrastructure comprises an entity selected from the group consisting of a base station controller, a radio network controller, a mobile switching center, and a packet data serving node.

6. The method of claim 1, wherein determining the ratio separately for each base station comprises the RAN infrastructure determining the ratio separately for each base station.

7. The method of claim 6, wherein the RAN infrastructure determining the ratio separately for each base station comprises, for each base station's backhaul link:

the RAN infrastructure monitoring a first quantity of the first type of data carried by the backhaul link;

the RAN infrastructure monitoring a second quantity of the second type of data carried by the backhaul link; and the RAN infrastructure computing as the ratio a ratio of the monitored first quantity to the monitored second quantity.

8. The method of claim 1, wherein the WCD has an active set consisting of coverage areas defined by the base stations.

9. The method of claim 1, wherein transitioning to the restricted mode comprises:
the RAN infrastructure discontinuing sending of the first type of data to each base station of the plurality other than the given base station; and
the RAN infrastructure transmitting to the WCD a control signal that directs the WCD to discontinue sending of the first type of data to each base station of the plurality other than the given base station.

10. An improvement in a wireless communication system comprising a radio access network (RAN) infrastructure and a plurality of base stations, the RAN infrastructure being coupled to each base station by a respective backhaul link, wherein the plurality of base stations concurrently serve a wireless communication device (WCD) each via a respective wireless coverage area, wherein the respective wireless coverage areas of the plurality of base stations cooperatively define an active set for the WCD, the improvement comprising:
backhaul-evaluation logic for determining that, among the backhaul links of the base stations, the backhaul link of a given one of the base stations has a lowest ratio of (a) carrying a first type of data to (b) carrying a second type of data; and
communication-control logic for responding to the determining by transitioning the system from a first operational mode to a second operational mode,
wherein, in the first operational mode all of the base stations of the plurality communicate both the first and second types of data with the WCD, and in the second operational mode, (i) the given base station communicates both the first and second types of data with the WCD while (ii) each other base station of the plurality communicates the second type of data with the WCD but does not communicate the first type of data with the WCD.

11. The improvement of claim 10, wherein the backhaul-evaluation logic and communication-control logic reside in the RAN infrastructure.

12. The improvement of claim 11, wherein the RAN infrastructure comprises an entity selected from the group consisting of a base station controller, a radio network controller, a mobile switching center, and a packet data serving node.

13. The improvement of claim 10, wherein the backhaul-evaluation logic comprises a processing unit programmed with instructions for carrying out functions comprising, for each backhaul link:
monitoring a first quantity of the first type of data carried by the backhaul link;
monitoring a second quantity of the second type of data carried by the backhaul link; and
computing as the ratio a ratio of the monitored first quantity to the monitored second quantity.

14. The improvement of claim 10, wherein the first type of data is control data, and the second type of data is bearer data.

15. The improvement of claim 14, wherein the first type of data comprises overhead data selected from the group consisting of channel list data, neighbor list, and power control signaling.

16. The improvement of claim 10, wherein each backhaul link is time division multiplexed.

17. The improvement of claim 10, wherein the communication-control logic comprises a processing unit programmed with instructions to transition the system from the first operational mode to the second operational mode by carrying out functions comprising:
causing the RAN infrastructure to discontinue sending of the first type of data to each base station of the plurality other than the given base station; and
causing the RAN infrastructure to transmit to the WCD a control signal that directs the WCD to discontinue sending of the first type of data to each base station of the plurality other than the given base station.

18. A method of managing backhaul capacity in a wireless communication system in which a plurality of base stations concurrently serve a wireless communication device (WCD), each base station communicating both control data and bearer data with the WCD, and each base station having a respective backhaul link with radio access network (RAN) infrastructure, wherein the plurality of base stations includes a given base station and one or more other base stations, the method comprising:
determining that, among the respective backhaul links of the plurality of base stations, the respective backhaul link of the given base station has a lowest ratio of control data to bearer data; and
responsive to the determining, the wireless communication system discontinuing communication of control data between the WCD and each other base station, while continuing communication of bearer data between the WCD and each base station of the plurality.

19. The method of claim 18, wherein the control data is particular control data, wherein the particular control data comprises data selected from the group consisting of channel list data, neighbor list, and power control signaling.

* * * * *